Sept. 18, 1934.   E. A. FIELD   1,973,868
FLOWER HOLDER
Filed July 3, 1933
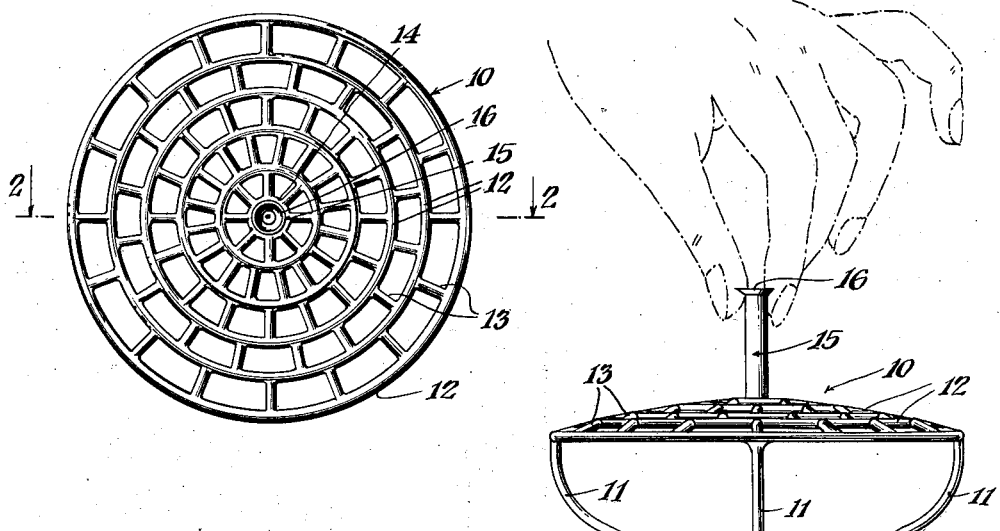
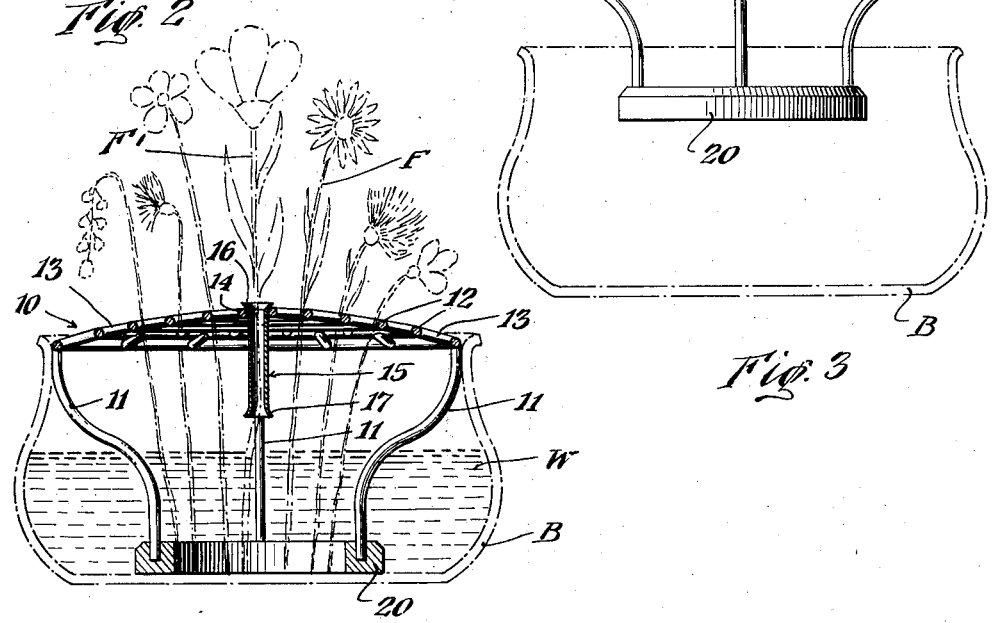
INVENTOR
Ethel A. Field
BY
Reuben J. Carlson
ATTORNEY Patented Sept. 18, 1934

1,973,868

UNITED STATES PATENT OFFICE 1,973,868

FLOWER HOLDER

Ethel A. Field, New York, N. Y.

Application July 3, 1933, Serial No. 678,771

6 Claims. (Cl. 47—41)

This invention relates to flower holders and more particularly to a flower holder having associated therewith means for transporting and moving the same. The flower holder forming the subject matter of this invention comprises generally a frame member having a series of openings therein adapted to receive the stems of one or more flowers. The frame is connected to a weighted base by means of suitable supports. The base maintains the frame in its proper upright position at all times and is preferably provided with a series of openings which receive the lower ends of the flower stems and assist in supporting the flowers in their decoratively arranged position. A carrying device is provided for the flower holder which preferably comprises a tubular member telescoped through a conveniently located aperture in the frame. The tubular member is provided with a rim or outwardly flared projecting portion on each end thereof which prevents removal of the tubular member from the frame. The tubular member is so made as to receive and support a flower stem in decorative arrangement with respect to the flowers surrounding the same. In one position the tubular member telescopes into the frame so as to be substantially concealed from view when the frame is filled with flowers. The tubular member may be easily grasped and raised upwardly until the rim on the lower end thereof engages the frame. The flower holder can then be conveniently carried and transported about when the tubular member is thus raised. The carrying means is adapted to be associated with the flower holder disclosed in my co-pending application Ser. No. 651,966, filed January 16, 1933. The flower holder may be positioned in a dish or other suitable receptacle and may be conveniently removed or inserted therein by the convenient carrying device above described.

An object of this invention is to provide a flower holder having associated therewith a convenient carrying means which may be easily grasped when the flower holder is to be carried or transported and which automatically telescopes into the flower holder so as to be substantially concealed from view when not in use.

Another object of this invention is to provide a carrying device for a flower holder which is unobtrusive, convenient, and inexpensive to manufacture and assemble and which also provides means for supporting one or more flower stems in decorative bouquet arrangement.

Other objects of this invention will become apparent as the disclosure proceeds.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which:

Fig. 1 is a top view of my flower holder having my novel carrying device associated therewith;

Fig. 2 is a vertical cross sectional view of the flower holder shown in Fig. 1 as it appears when positioned in a dish with flowers arranged therein; and Fig. 3 is a side view of the flower holder as it appears when lifted from the flower dish by means of my novel lifting device.

Similar reference characters refer to similar parts throughout the several views of the drawing.

The flower holder shown in Figs. 1, 2, and 3 comprises a flower holder frame 10 supported by the legs 11 from a weighted base member 20. The flower holder frame may comprise a sheet metal stamping, or may be formed from wire woven into a network arranged so as to provide a plurality of flower receiving openings. The flower holder may be positioned within the flower bowl or vase B as shown in Fig. 2 and if natural flowers F are arranged within the holder, water W or other nourishment may be provided in the bowl so as to cover the base and lower portion of the flower holder and the lower ends of the flower stems.

The flower receiving frame may comprise a plurality of concentric rings 12 connected by suitable stays 13 which define the flower receiving openings therebetween. A small ring 14 conveniently located within the flower frame is provided through which the tubular lifting device 15 is inserted. The ring 14 and the tubular lifting device 15 may be positioned centrally of the flower frame or in any convenient position. One or more lifting devices 15 may be provided as found convenient and desirable. The lifting device 15 is provided with an outwardly flared portion 16 at the upper end thereof so made as to overhang the ring 14 preventing the lifting device from dropping out of the frame. The lower end of the lifting device 15 is also provided with an outwardly flared rim or projecting portion 17 adapted to engage the under-side of the ring 14 when the lifting device is raised into carrying position, as shown in Fig. 3. The outwardly flared portion 16 is so made as to permit the same to be grasped by the fingers when in the lower position shown in Fig. 2.

It will be noted that when the lifting device normally drops into the frame, the outwardly flared portion 16 rests upon the ring 14. In this position the lifting device is substantially concealed within the frame of the flower holder and is not visible when surrounded with flowers. The lifting device 15 is tubular and adapted to receive a flower F1 and support the same in decorative arrangement. The lifting device is not of great weight and can be lifted into carrying position by a slight upward lift on the flower F1 which frictionally engages the lifting device 15 to raise the same up so that it can be easily grasped. In such event, the outwardly flared portion 16 need not be used as a grasping means to raise the lifting device into carrying position. It will thus be seen that the tubular member 15 serves as a lifting device for the flower holder and also serves as a flower receiving and supporting device.

By means of the lifting device, the flower holder may be lifted into and out of the flower bowl B and transported about as found desirable without difficulty. The lifting device is tubular and is substantially concealed within the frame when the frame is filled with flowers. The lifting device is convenient to grasp and does not interfere with the decorative arrangement of the bouquet. The lifting device is adapted to be associated with different types of flower holders, but I have found it especially convenient as a lifting means in connection with the flower holder disclosed in my copending application above mentioned.

While certain novel features of the invention have been disclosed and are pointed out in the annexed claims, it will be understood that various omissions, substitutions and changes may be made by those skilled in the art without departing from the spirit of the invention.

What is claimed is:

1. A flower holder comprising a frame having a plurality of openings therein arranged to receive and support a plurality of flowers in decorative bouquet assembly, and means normally concealed within said frame or lifting the flower holder about.

2. A flower holder of the character described, comprising a frame having a plurality of openings therein arranged to receive and support a plurality of flowers in decorative bouquet assembly, and means telescoping into the frame for lifting the flower holder about.

3. A flower holder comprising a frame having a plurality of openings therein arranged to receive and support a plurality of flowers in decorative bouquet assembly, and a carrying element telescoping through an aperture provided in said frame for transporting the flower holder about.

4. A flower holder of the character described, comprising a frame having a plurality of openings therein arranged to receive and support a plurality of flowers in decorative bouquet assembly, and a carrying element telescoped through an aperture provided in said frame, said element having a projecting portion on each end thereof engaging the frame and retaining the same against removal.

5. A flower holder comprising a frame having a plurality of openings therein arranged to receive and support a plurality of flowers in decorative bouquet assembly, and a tubular element telescoped through an aperture provided in said frame, said element having a projecting portion on each end thereof for retaining the same in said frame.

6. A flower holder of the character described, comprising a frame having a plurality of openings therein arranged to receive and support a plurality of flowers in decorative bouquet assembly, a weighted base, supports connecting said base and frame, a tubular element telescoped through an aperture provided in said frame, said element having a projecting portion on each end thereof to retain the same in said frame, said element in one telescoped position being substantially concealed from view and adapted to receive and support flowers, and in another telescoped position to serve as a finger grip by means of which the flower holder may be transported about.

ETHEL A. FIELD.